United States Patent [19]
Farrell et al.

[11] Patent Number: 5,640,543
[45] Date of Patent: Jun. 17, 1997

[54] SCALABLE MULTIMEDIA PLATFORM ARCHITECTURE

[75] Inventors: Robert Farrell, Hillsborough; Louis Lippincott, Roebling, both of N.J.

[73] Assignee: Intel Corporation, Santa Clara, Calif.

[21] Appl. No.: 625,985

[22] Filed: Apr. 1, 1996

Related U.S. Application Data

[63] Continuation of Ser. No. 472,383, Jun. 7, 1995, abandoned, which is a continuation of Ser. No. 346,349, Nov. 29, 1994, abandoned, which is a continuation of Ser. No. 62,462, May 13, 1993, abandoned, which is a continuation-in-part of Ser. No. 901,383, Jun. 19, 1992, Pat. No. 5,335,321.

[51] Int. Cl.$^6$ .................................................. G06F 15/16
[52] U.S. Cl. ...................... 395/502; 395/508; 395/520; 345/201
[58] Field of Search ............................... 345/185, 189, 345/201; 273/85 G, 237, 434; 395/280, 284, 306, 309, 502, 508, 509, 511, 520

[56] References Cited

U.S. PATENT DOCUMENTS

| | | | |
|---|---|---|---|
| 5,190,285 | 3/1993 | Levy et al. | 273/85 G |
| 5,315,700 | 5/1994 | Johnston et al. | 395/162 |

OTHER PUBLICATIONS

IBM Technical Disclosure Bulletin vol. 32 No. 4B, Sep. 1989, "video system with real-time multi-image capibility and Transparency", pp. 192–193.

*Primary Examiner*—Kee M. Tung
*Attorney, Agent, or Firm*—William H. Murray

[57] ABSTRACT

Scalable platform architecture includes a high bandwidth bus for transmitting data at high bit rates between various video processing subsystems. A graphics processing subsystem, having graphics memory, is coupled to the high bandwidth bus. The graphics processing subsystem is adapted to receive a video memory and to perform video processing when the video memory is received. The high bandwidth bus is provided with expansion connectors for detachably coupling to various subsystems. These subsystems may include a video processing subsystem and a video capture system. The high bandwidth bus is also provided with a bus bridge for coupling the high bandwidth bus to a low bandwidth bus or a central processing unit bus.

9 Claims, 6 Drawing Sheets

SCALABLE MULTIMEDIA PLATFORM ARCHITECTURE

This application is a continuation of application Ser. No. 08/472,383, filed on Jun. 7, 1995, now abandoned which is a continuation of application Ser. No. 08/346,349, filed on Nov. 29, 1994, now abandoned, which is a continuation of application Ser. No. 08/062,462, filed on May 13, 1993, now abandoned, which is a continuation-in-part of application Ser. No. 07/901,383, filed on Jun. 19, 1992, which issued as U.S. Pat. No. 5,335,321 on Aug. 2, 1994.

FIELD OF THE INVENTION

This invention relates to video signal processing generally and particularly to systems for providing a digital signal representative of video and graphics information.

BACKGROUND OF THE INVENTION

In the video signal processing art there is usually a single central processing unit that has control over a bus which couples all the components attached to the central processing unit. As a result, the transactions that can take place are very restricted because there is only the one processing unit performing the applications as well as controlling the graphics subsystem. This works well only for low resolution graphics applications. There are add on cards which allow some acceleration in the graphics controller chip. This improvement saves bandwidth and allows off-loading of some high level commands to the graphics subsystem. For example, the central processing unit may send commands to draw a line or to draw a rectangle and merely provide coordinates to the graphics subsystem. This permits acceleration of the process compared with sending pixel-by-pixel information.

At low resolution graphics this approach worked well enough. At higher resolution applications, however, the central processing unit may still be overwhelmed. Thus as graphics resolutions increased, it was possible to add acceleration in order to accelerate some of the graphics operation but it eventually reached a point where the actual bus bandwidth of a typical bus in a computer system could not sustain the very high update rate of graphics images. This is further complicated when video is added because video must be updated at thirty frames a second, and may require five to nine megabytes per second sustained bandwidth across a bus into the graphics subsystem.

The goal of attaining an integrated video/graphics system requires system architecture which balances the often conflicting requirements of video subsystems and graphics subsystems. For example, while increasing horizontal and vertical resolution is useful to graphics images, in digital video subsystems increasing horizontal and vertical resolution is very expensive and may not perceptibly change the image quality. Likewise, in graphics subsystems, the pixel depth, the number of simultaneous colors available, is not as important as it is for video systems. While sixteen bit near-true-color pixels are more than adequate for a graphics system, a video system may advantageously make use of twenty-four bit pixels.

The performance budget of a video processor in a digital video subsystem during playback is divided and used to perform two tasks: (1) creating the video image from a compressed data stream, and (2) copying/scaling the image to the display buffer. The performance budget of the video subsystem must be balanced between the copy/scale operation and the video decompression operation. Both operations must be performed thirty times a second for smooth, natural motion video. The division of the performance budget is usually done to worse case which results in an allocation of sufficient performance with the remaining performance being dedicated to the video decompression operation for a full screen motion video copy/scale operation. If the number of pixels and/or bytes that have to be written in the copy/scale operation are increased, the performance of the video decompression necessarily decreases. For increased resolution, for a predetermined level of video technology, a point is reached where the video image starts to degrade because the information content in the decompressed image is too low.

As noted above, the requirements for a graphics system include high horizontal and vertical resolution with shallow pixels. A graphics subsystem in which the display is one kilobyte by one kilobyte with eight bit clut pixels substantially meets the needs of all but the most demanding applications. In contrast, the requirements for the video system include the ability to generate twenty-four bit true color pixels with a minimum of bytes in the display buffer. A typical adequate graphics subsystem may have 352×240×24 bits in YUV format. Although this can be scaled up for full screen, for many applications full screen is not required.

Systems integrating a graphics subsystem display buffer with a video subsystem display buffer generally fall into two categories. The two types of approaches are known as single frame buffer architectures and dual frame buffer architectures.

The single frame buffer architecture is the most straight forward approach and consists of a single graphics controller, a single digital-to-analog converter and a single frame buffer. In its simplest form, the single frame buffer architecture has each pixel on the display represented by bits in the display buffer that are consistent in their format regardless of the meaning of the pixel on the display. In this architecture graphics pixels and video pixels are indistinguishable in the frame buffer memory. However, the single frame buffer architecture graphics/video subsystem, i.e. the single frame buffer architecture visual system, does not address the requirements of the video subsystem very well. Full screen motion video on the single frame buffer architecture visual system requires updating every pixel in the display buffer thirty times a second. This frame buffer is most likely on the order of 1280×1024×8 bits. Even without the burden of writing over thirty megabytes per second to the display buffer, eight bit video by itself does not provide the required video quality. This means the single frame buffer architecture system can either move up to sixteen bits per pixel or implement the eight bit YUV subsampled technique.

A visual system must be able to mix video and graphics together on a display which requires the display to show on occasion a single video pixel located between graphics pixels. Because of the need to mix video and graphics every pixel in the display buffer must be a stand-alone, self-sustaining pixel on the screen.

It is an object of the present invention to provide an integrated system for storing and displaying graphics and video information.

It is further object of the present invention to provide a system for storing and displaying either graphics or video information, which system can be scalably upgraded into an integrated system for storing and displaying graphics and video information.

Further objects and advantages of the invention will become apparent from the description of the invention which follows.

SUMMARY OF THE INVENTION

The scalable platform architecture of the present invention includes a high bandwidth bus for transmitting data at high bit rates between various video processing subsystems. A graphics processing subsystem, having graphics memory, is coupled to the high bandwidth bus. The graphics processing subsystem is adapted to receive a video memory and to perform video processing when the video memory is received. The high bandwidth bus is provided with expansion connectors for detachably coupling to various subsystems. These subsystems may include a video processing subsystem and a video capture system. The high bandwidth bus is also provided with a bus bridge for coupling the high bandwidth bus to a low bandwidth bus or a central processing unit bus.

DETAILED DESCRIPTION OF THE PREFERRED EMBODIMENT

Figure 1:
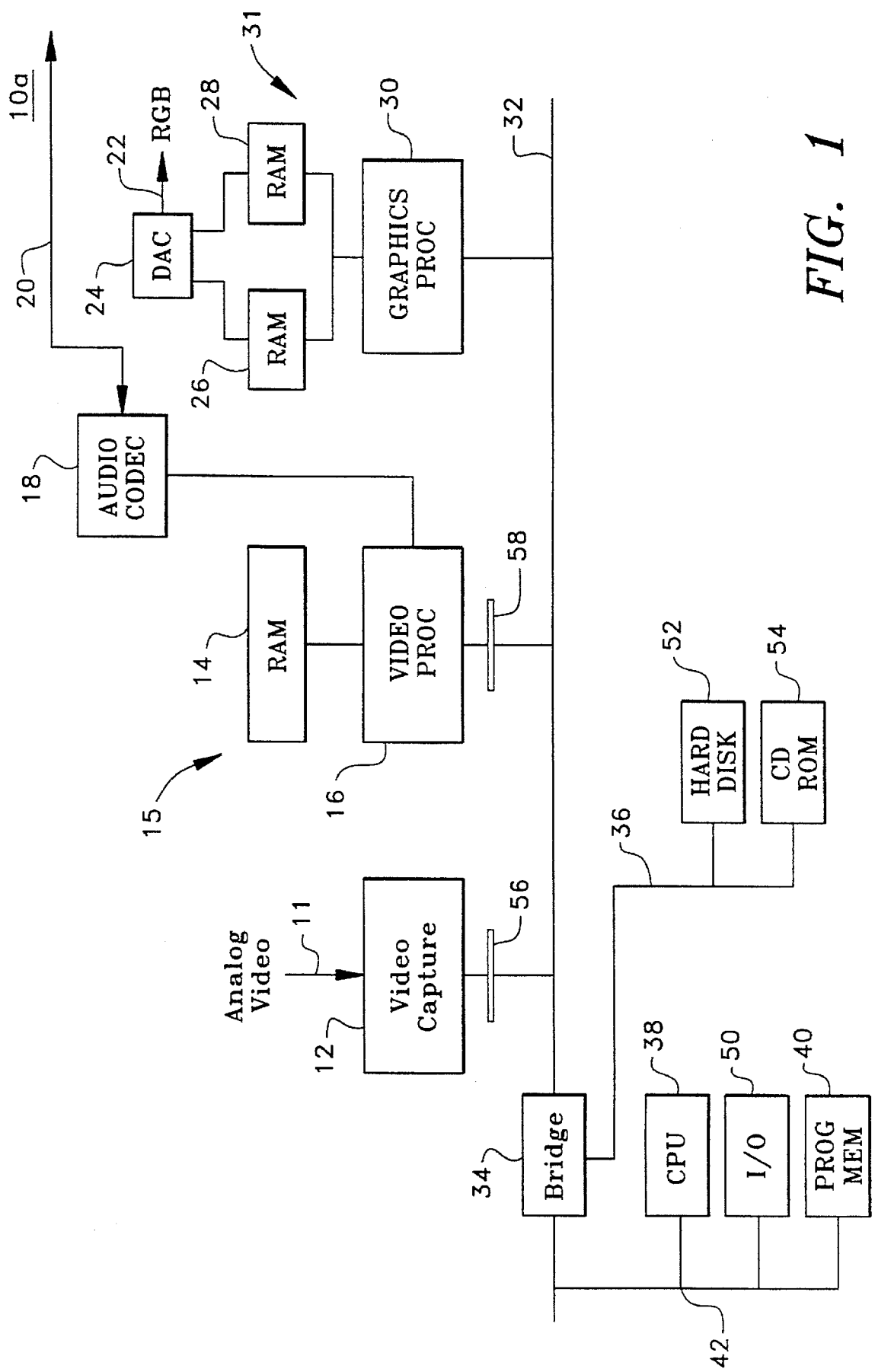
FIGS. 1-5 are block diagram representations of alternate embodiments of the scalable architecture of the present invention.
Figure 3:
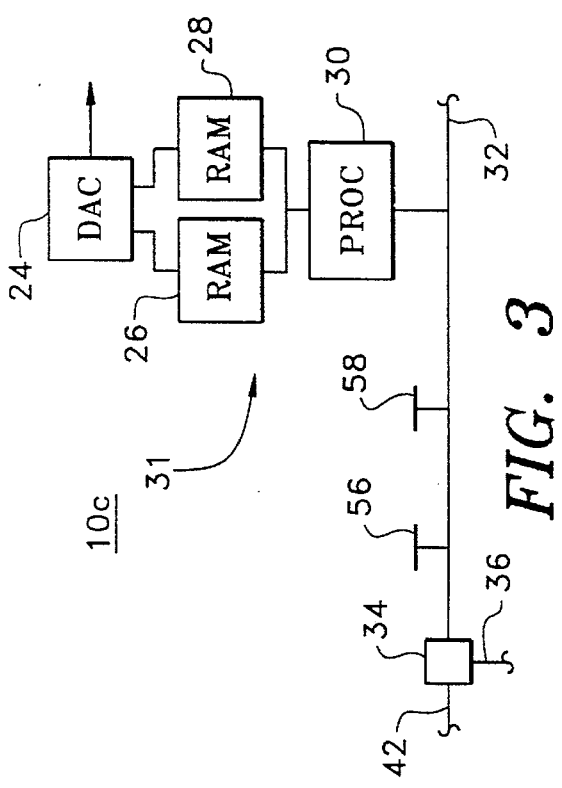
Figure 5:
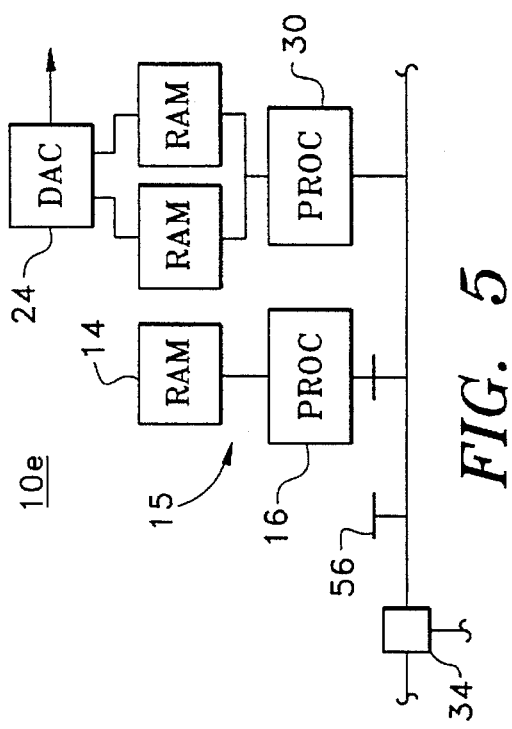
Figure 2:
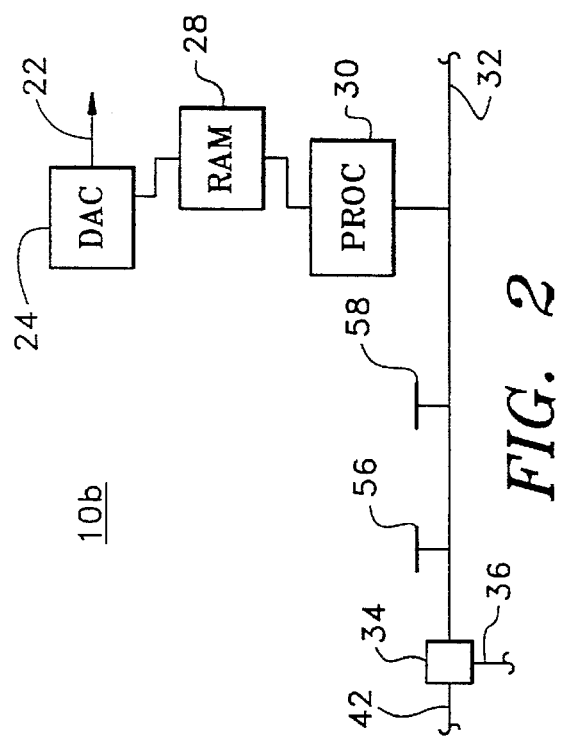
Figure 4:
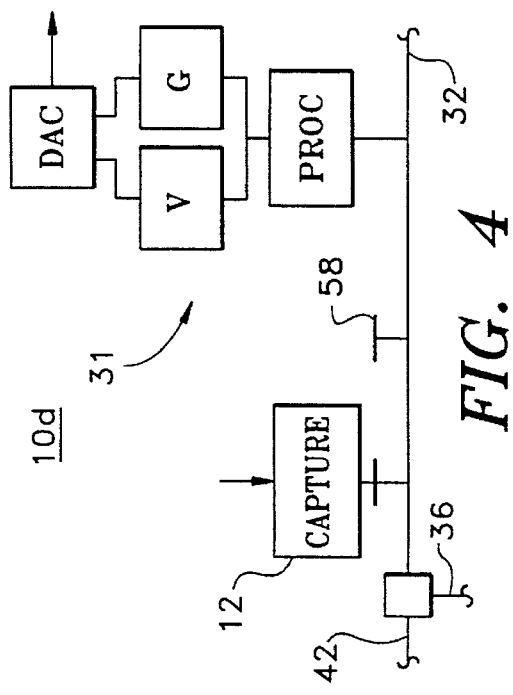

Referring now to FIG. 1, there is shown a block diagram representation of multimedia scalable platform architecture 10a. Within multimedia scalable platform architecture 10a high performance bus 32 is coupled to video capture subsystem 12, video accelerator subsystem 15, and graphics accelerator subsystem 31 in order to permit transfer of data therebetween at very high rates. High performance bus 32 is adapted to be decoupled from the lower-bandwidth traffic of central processing unit bus 42 and low bandwidth bus 36 by bus bridge 34. This permits very high video and graphics data processing rates for manipulation and transmission of images by subsystems 12, 15 and 31 without reference to the slower devices on buses 36, 42.

Multimedia platform architecture 10a is adapted so that its capability is scalable by means of expansion connectors 56, 58 and by the addition or removal of memory 26 within graphics accelerator subsystem 31. Expansion connector 56 is provided in architecture 10a in order to permit capture subsystem 12 to be detachably coupled to high performance bus 32. Expansion connector 58 is provided in architecture 10a in order to permit video accelerator subsystem 15 to be detachably coupled to high performance bus 32. This permits platform architecture 10a to have scalable processing performance.

High performance bus 32 of multimedia scalable platform architecture 10a is a physical interconnect adapted to permit graphics and video processors, such as the processors of video subsystem 15 and graphics subsystem 31, as well as other highly integrated subsystems, to connect to a common interface using a minimum of interface logic. In the preferred embodiment of scalable architecture 10a high performance bus 32 may preferably be a thirty-two bit transaction oriented bus with a peak data transfer rate of approximately one hundred megabytes per second.

Video capture subsystem 12 of scalable platform architecture 10a accepts composite baseband input by way of analog input line 11 and digitizes an image in a manner known to those skilled in the art. The captured image output of video capture subsystem 12 may be applied to high performance bus 32 in separate full resolution Y bitmaps and variable resolution (2:1, 4:1) UV subsampled bitmaps.

Video accelerator subsystem 15 of scalable multimedia platform architecture 10a detachable coupled directly to high performance bus 32 by way of expansion connector 58. Video subsystem 15 includes video processor 16 and local video memory 14. Both the video processing and the audio processing within scalable platform architecture 10a may be performed within video accelerator 15. Within video accelerator subsystem 15 the requirements for video memory 14 are that it be "shallow" and "wide" rather than simply extensible.

A basic configuration of scalable architecture 10a may include one thirty-two bit bank of memory within video subsystem 15. A high performance basic configuration may include a sixty-four bit bank for a high-bandwidth interface. Usually the choice of the width of high performance bus 32 is constrained by the application demands for memory bandwidth, whereas the bank size and/or the number of banks within subsystem 15 are determined by the application demands for total memory. These two choices are interrelated because a sixty-four bit interface also doubles the total amount of memory all other parameters being equal.

Graphics accelerator subsystem 31 of scalable multimedia platform architecture 10a includes graphics processor 30 as well as random access memories 26, 28 for video and graphics storage respectively. Memories 26, 28 of graphics subsystem 31 may be virtual memories. Graphics output path 22 is provided within graphics subsystem 31 for transmitting video and graphics. Digital-to-analog converter 24 of graphics subsystem 31 is of a conventional design which is adapted to merge the bit streams from video memory 26 and graphics memory 28.

Central processing unit 38 is coupled to central processing unit bus 42 regardless of which subsystems are coupled to high performance bus 32 by way of expansion connectors 56, 58 of scalable architecture 10a. Program memory 40 and base input/output 50 may be provided for central processing unit 38 by way of central processing unit bus 42. Additionally, low bandwidth bus 36 may be provided for coupling devices such as hard disk 52 and compact disc storage 54 to scalable architecture 10a. It will be understood by those skilled in the art that in an alternate embodiment (not shown) mass storage devices 52, 54 may be coupled directly to bus 32 rather than bus 36.

Bus bridge 34 of scalable platform architecture 10a allows communications between high performance bus 32, central processing unit bus 42, and low bandwidth bus 36. Bus bridge 34 also provides isolation of buses 32, 36, 42 from each other. Bridge 34 is thus the central switch point between central processing unit 38, high performance bus 32 and low bandwidth bus 36 within scalable platform architecture 10a. It allows bridging between the three busses 32, 36, 42 at minimum latency using a simple arbitration and preemption protocol.

Upgrades of Scalable Architecture

Referring now to FIGS. 2-5, there are shown the portions of multimedia scalable platform architectures 10b,c,d,e of the present invention which are directly coupled to high performance bus 32. Multimedia scalable platform architectures 10b,c,d,e are alternate embodiments of multimedia scalable platform architecture 10a wherein portions of scalable architecture 10a are not provided in order to trade off some of the system performance of architecture 10a for the simplified and less expensive configuration of architectures 10b,c,d,e. The portions of architecture 10a removed to provide architectures 10b,c,d,e are easily coupled and decoupled to provide easily upgradable system performance.

Scalable multimedia platform architecture 10b includes graphics processor 30 along with graphics random access memory 28 and single active frame buffer digital-to-analog convertor 24. Scalable multimedia platform architecture 10b performs the functions of a basic conventional single graphics system having a single graphics memory in a manner in which is well known in the art. Such a basic graphics system is capable of performing software decode of video signals and providing video playback at an acceptable image quality using a single bank of memory for video and graphics.

Scalable multimedia platform architecture 10c is an upgrade of scalable multimedia platform architecture 10b. In scalable platform architecture 10c, video memory 26 is coupled to video processor 30 and single active frame buffer digital-to-analog convertor 24 in parallel with graphics memory 28. Additional video memory 26 of scalable platform architecture 10c may, for example, have a size of approximately one megabyte. This configuration within scalable platform architecture 10c is equivalent to graphics accelerator subsystem 31 of scalable platform architecture 10a.

When video memory 26 is present within graphics accelerator subsystem 31 central processing unit 38 may software decode the video information and write into video memory 26 rather than sharing graphics memory 28. For example, the coupling of video memory 26 to scalable platform architecture 10b to form graphics accelerator subsystem 31 may permit twenty-four bits per pixel rather than eight bits per pixel. It will be understood that this applies to video images only. This permits a user to obtain better video image quality than that available using platform architecture 10b by merely adding additional memory to platform architecture 10b in order to form platform architecture 10c.

Scalable multimedia platform architecture 10d is an upgrade of scalable multimedia platform architecture 10c. In scalable multimedia platform architecture 10d, video capture subsystem 12 is coupled to high performance bus 32 by way of expansion connector 56. Video capture subsystem 12 is adapted to capture and digitize analog and video input for capturing data for real time playback and conferencing applications. The dedicated capture functions within video capture subsystem 12 permit capture of analog and video signals without the presence of video accelerator subsystem 15 of scalable multimedia platform architecture 10a. Thus using platform architecture 10d it is thus possible to capture video signals and have central processing unit 38 compress the data at a lower frame rate and resolution. This permits the user to trade off quality of image for the cost of a hardware accelerator.

When video accelerator subsystem 15 is coupled to high performance bus 32 of scalable multimedia platform architecture 10d by way of expansion connector 58, architecture 10d is upgraded to the full capability of scalable multimedia platform architecture 10a. The addition of video accelerator subsystem 15 to platform architecture 10d permits acceleration of video conferencing and video playback and thereby provides higher quality images. It will be understood by those skilled in the art that in architecture 10e, an alternate embodiment of scalable multimedia platform architectures 10a,b,c,d, video accelerator subsystem 15 may be coupled to scalable multimedia platform architecture 10c by way of expansion connector 58 without coupling video capture subsystem 12 to high performance bus 32.

When video accelerator system 15 is provided within platform architecture 10a, the video and audio decode of platform architecture 10a are performed by video processor 16. In this case the video and audio are decompressed by video processor 16. The video is written into the frame buffer of graphics subsystem 31. The audio is written to external audio coder 18 and audio serial interface 20.

Similar to the decode by central processing unit 38, the source of the video and audio data may be either low bandwidth bus 36 or one of the integrated subsystems on high performance bus 32. The required data rate for the video stream is about one hundred fifty kilobytes per second. The compressed bitstream is written through video processor 16 into a compression buffer in local memory 14 of subsystem 15.

Once the compressed data is written into local memory 14, the decompression process may be initiated. Depending upon the decompression algorithm used to decode the image, two to four frame buffers may be required in local memory 14. For example, for px64 decode, one reference frame and one reconstructed frame are required for decode. For MPEG, two reference frames, one reconstructed frame and one frame in progress must be saved in local memory 14.

Because video processor 16 is programmable, it may support a wide variety of algorithms. Its architecture should be general enough to offer a substantial performance increase over a decode by central processing unit 38. Furthermore it should be provided with enough specific acceleration hardware to improve the performance of software decompression algorithms.

Processing Within Scalable Architecture

Video capture subsystem 12 includes a video codec (not shown) which performs analog-to-digital conversion upon the analog video signals and permits capture of the resulting digital signals. A capture ASIC then performs a series of processes upon the captured video signals. It will be understood that within the multimedia scalable platform architecture of the present invention the three video components (Y, U and V) are processed as separate bit maps. It will also be understood that during this processing, within capture subsystem 12, a timing block keeps track of the line count, counts pixels for the word buffer loads, determines even and odd field times, and determines when the pitch values are added to the pointer values.

Since there is typically four times as much Y data as either U or V, additional word buffers for Y are more efficient than additional word buffers for U and V. It is possible to save circuitry by storing the U and V planes as an interdigitated UV plane which saves a word buffer and its associated pointer and pitch registers. However the gate savings compared with the total circuitry is small and this requires that video processor 16 separate the UV bit plane into each component as either a separate software step or as part of the color plane processing. Sequencing through the bytes is a common operation and the pointer arithmetic can be combined into one arithmetic unit. Thus the gate savings translates to only the actual register storage.

High performance bus 32 of scalable platform architectures 10a,b,c,d,e is coupled to central processing unit 38 and low bandwidth bus 36 by way of bus bridge 34 or bus interface 34 as previously described. To support standard bus protocols, the DMA must transfer (352×240)+(2×180× 120) bytes or 129,600 bytes in 1/60 second, followed by more bytes in the next 1/60 second. So while the average DMA rate is 3.888 megabyte/second, high performance bus 32 must be able to sustain 7.776 megabyte/second during the active frame.

Temporal subsampling within scalable multimedia platform architecture 10a produces artifacts such as the wheels on cars rotating in the wrong direction for the apparent motion of a vehicle. Temporal filtering of the data to solve this type of problem is expensive because it requires a whole frame store and may consume significant amounts of computing power for little improvement in perceived picture quality. Temporal subsampling actually simplifies the design of the pointer and pitch register block because a full complement of registers for each field is unnecessary. In this case, the timing block shuts off the entire DMA during the discarded field.

Horizontal Y subsampling yields artifacts in processed video which may be controlled by two factors within architecture 10a. First, the Y data may be oversampled leaving some time for subsampling. Second, in video sources that produce video data directly and preserve the high frequency content it is preferable to pass the Y data through a finite impulse response kernel. An acceptable filter for doing this may be a seven tap filter wherein two of the coefficients are zero. The remaining five coefficients may be implemented with a succession of at most three adders per coefficient. The final divisor may be chosen to be two hundred fifty-six bits. This is a simple shift right.

It is possible to subsample the UV data horizontally. There is also an adjustable Y phase delay which may be used to insure the correct alignment of the UV pixels to the Y pixels. In addition, the UV data is subsampled in the vertical direction as well. This subsampling may be accomplished either within video processor 16 or within video capture subsystem 12. The most obvious method of subsampling is merely using only a portion of the data and discarding the unused data. This is referred to as simple subsampling. However, this method may produce significant frequency foldover artifacts. These artifacts occur because within some frames the color samples may come from one area and the colors may appear washed out or wrong. Within other frames, the color sample may line up with another color and a highly saturated color may result.

Good vertical color map sub-sampling in hardware requires two additions to the basic capture ASIC. A UV multi-line buffer must be added either internally or externally in a random access memory. Additionally, an arithmetic kernel for low-pass filtering of the two-dimensional data into a sample stream may be safely sub-sampled.

It will thus be understood that there are three possible solutions to this problem; simple subsampling, filtering in hardware, and filtering in software. It is believed to be inefficient to perform subsampling without filtering in software within video accelerator subsystem 15.

The basic sampling clock rate is locked at twenty seven megahertz. The Y data rate is thirteen and one-half megabytes/second and since only every other Y sample is produced on the other side of the finite impulse response filter, there are four clock cycles in which to compute the sample. In the preferred filter embodiment there are only five non-zero coefficients, each of which has at most three bits on, for a total of fifteen additions. Since there are four clock periods in which to perform the operations, a circuit design may be provided using eight pixel registers, three adders and a sixteen bit feedback register.

Vertical filtering of the UV data requires an external multi-line store. Four bits of either U or V data are provided every two clock cycles in this method of filtering. Using the preferred filter coefficients, there are only six additions every eight clocks for both U and V, for a total addition of twelve. Thus only four pixel registers, one adder and an eleven bit feedback register for each color byte are required in this method. Also, two byte writes and six byte reads from the external line buffer are required. This may be accomplished with an external four bit latch and a one kilobyte by eight bit high speed static random access memory.

The capture ASIC may be implemented with ninety-two signal input/output lines and approximately 5700 to 6200 equivalent gates. This gate count may include full even and odd double buffered pointers, and eight byte word buffers for each of Y, U and V data types. The estimated size of the Y finite impulse response filter may be four hundred gates. Each of the U and V filters of this system may require somewhat less than two hundred gates each, and the static memory controller may require three to four hundred cells depending on how integrated it is with the timing block. Adding internal storage for the UV line buffers may add ten to eleven kilogates in complexity unless the ASIC has an structure optimized for memory requirements.

Graphics Subsystem

Conventional personal computer architectures utilize a single system bus such as central processing unit bus 42. This limits performance, since the slowest device on bus 42 determines the maximum transaction rate of such an architecture. Additionally, when one central processing unit 38 controls all of the platform resources of the system, low bandwidth transactions have a significant impact on the overall system performance. As resolution requirements increase, and more graphics operations are performed during each cycle, the input/output accesses to a remote frame buffer, usually on central processing unit bus 42, cause a bottleneck.

In order to alleviate this problem graphics accelerator subsystem 31 may be provided to upgrade the scalable platform as previously described. While moving the frame buffer closer to central processor unit 38 increases graphics performance, the input/output problem quickly reappears when video processing is included. In order to attain the level of performance necessary for video processing and to maintain the required bandwidths into the frame buffer, graphics subsystem 31 is isolated on separate high performance bus 32.

In the preferred embodiment of platform architecture 10a graphics accelerator subsystem 31 may allow twenty-four bit video resolution to coexist with an existing eight or sixteen bit graphics frame buffer. This permits higher bandwidth into the digital-to-analog converter at lower clock rates, as well as facilitating the merging of video and graphics pixels. Both of these features greatly simplify the overall design of graphics subsystem 31.

The source of the video may be either low bandwidth bus 36 or a subsystem on high performance bus 32. The required data rate for the video stream is about one hundred fifty kilobytes per second. Whether the source of the video is bus 36 or a subsystem on bus 32 there are similar bandwidth requirements and latency through bus bridge 34 to system memory. Note that since central processing unit 38 performs the decode operation, the low bandwidth transaction does not degrade system performance by interfering with writes to the frame buffer.

Once the compressed data is in the system memory, central processing unit 38 may begin the decompression process. Depending on the algorithm used, image quality, and frame rate desired, this requires between eighty and one hundred percent of the available processing power of central processing unit 38.

Single Active Frame Buffer

Figure 6:
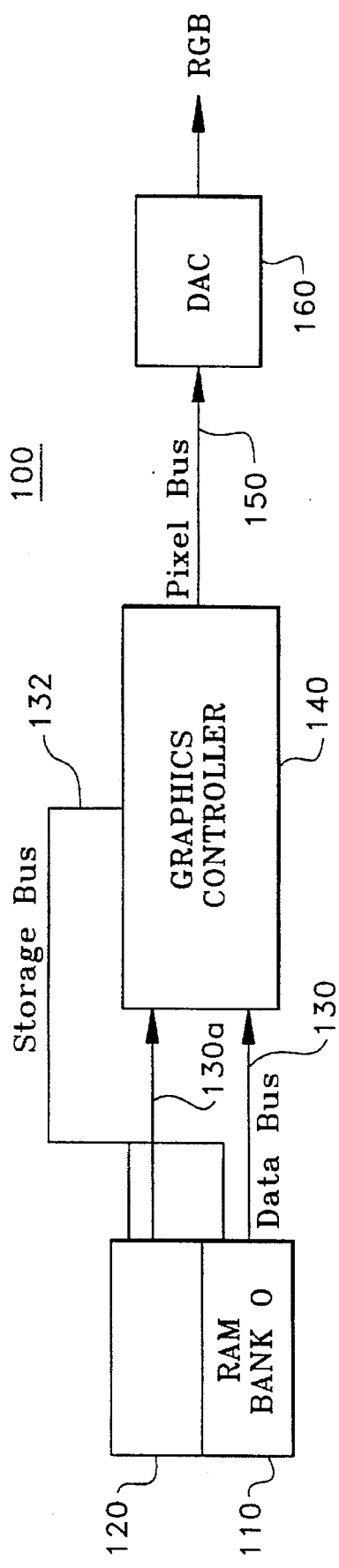
FIGS. 6, 7 are alternate embodiments of a single active frame buffer of the type suitable for use in the architecture of FIG. 1.

Referring now to FIG. 6, there is shown a block diagram illustrating the operation of an apparatus, designated generally 100. Apparatus 100 may advantageously be used for processing video data within the scalable multimedia platform architectures of the present invention. Apparatus 100 includes first storage means 110 for storing a first bit plane of visual data in a first format. First storage means 110 is coupled to graphics controller 140 through storage bus 130. It will be understood that in the preferred embodiment of apparatus 100 graphics controller 140 may be substantially similar to graphics processor 30 of scalable platform architectures $10a,b,c,d$. First storage means 110 and graphics controller 140 are also coupled by data bus 130. Apparatus 100 also includes means 120 for receiving a second storage means for storing a second bit plane of visual data in a second format different from the first format.

Means 120 is adapted to couple a second storage means to graphics controller 140 through the storage bus 132. Thus an upgrade from scalable architecture $10b$ to scalable architecture $10c$ of the present invention may be performed in this manner. Means 120 is also adapted to couple the second storage means to graphics controller 140 by data bus $130a$. Graphics controller 140 includes means for forming a merged pixel stream from visual data stored on said first and second storage means. Means 160 for displaying the merged pixel stream is also provided. Means 160 is coupled to graphics controller 140 by pixel bus 150. In the preferred embodiment of apparatus 100, data bus 130 and data bus $130a$ are separate eight bit buses. In an alternative embodiment, a single sixteen bit data bus may be used to couple both first storage means 110 and a second storage means to graphics controller 140. Data buses of other widths may also be used.

In apparatus 100 first storage means 110 is represented by RAM BANK 0. This base configuration may operate in an eight-bit CLUT mode. This mode allows operation of RAM BANK 0 as a single frame buffer architecture in eight bits per pixel mode. The eight bit CLUT mode may allow for operation of the base configuration as a video only on graphics only subsystem. The base configuration may also operate as a single frame buffer architecture system with limited graphics/video integration, for example a system with eight bits/pixel. In the eight bit CLUT mode, the bandwidth of data bus 130 is the same as would be required for a stand alone eight bit CLUT graphics subsystem.

Means 120 for receiving a second storage means allows the base configuration of the present invention to be easily upgraded by the mere addition of a second storage means to operate either as (i) an integrated system for storing and displaying both graphics and video information, the dual color space mode, or as (ii) an expanded single frame buffer for storing and displaying either graphics only or video only information at a deepened pixel depth and/or increased resolution level the expanded single frame buffer mode.

In the dual color space mode, a first type of visual data may be stored in first storage means 110 in a first format, and a second type of visual data may be stored in a second storage means in a second format which is different from the first format. For example, graphics data may be stored in first storage means 110 in RGB format, and video data may be stored in the second storage means in YUV format. In the expanded single frame buffer mode, first storage means 110 and a second storage means preferably provide for operation of the system as a video only system or a graphics only subsystem with 16 bits per pixel. The expanded single frame buffer mode may also operate as a single frame buffer architecture system with limited graphics/video integration, for example sixteen bits/pixel.

Graphics controller 140 includes means for forming a merged pixel stream from data in a first format stored on storage means 110 and data which may be stored in a second format on a second storage means, once a second storage means is received by means 120. According to a preferred embodiment, when the base system is upgraded, for example when a second storage means is received by means 120, and operating in the dual color space mode, graphics data is stored in one of the storage means in eight bit CLUT format, and video data is stored in the other storage means as eight bit YUV data. The preferred format of the eight bit YUV data in the dual color space mode with each position being a single byte may be expressed as: $Y_a\ U_a\ Y_b\ V_a\ Y_c\ U_b\ Y_d\ V_b\ Y_e\ U_c \ldots$ .

In the dual color space mode, a first pixel stream representing the RGB graphics pixels ($GP_n$) is processed in parallel with a second pixel stream representing YUV video pixels. The two parallel pixel streams are stored in parallel in accordance with the following format:

$GP_1\ GP_2\ GP_3\ GP_4\ GP_5\ GP_6\ GP_7\ GP_8\ GP_9 \ldots$ $Y_a\ U_a\ Y_b\ V_a\ Y_c\ U_b\ Y_d\ V_b\ Y_e \ldots$ The pixels generated by the video subsystem ($VP_n$) in the dual color space mode are preferably twenty-four bit RGB values derived from twenty-four bit YUV pixels. The twenty-four bit YUV pixels are determined for each video pixel $VP_n$ in accordance with the following formula:

$Y=Y_a$, $U=U_a$, and $V=V_a$ for $VP_1$;

$Y=0.5Y_a+0.5Y_b$, $U=0.75U_a+0.25U_b$, and $V=0.75V_a+0.25V_b$ for $VP_2$;

$Y=Y_b$, $U=0.5U_a+0.5U_b$, and $V=0.5V_a+0.5V_b$ for $VP_3$;

$Y=0.5Y_b+0.5Y_c$, $U=0.25U_a+0.75U_b$, and $V=0.25V_a+0.75V_b$ for $VP_4$;

$Y=Y_c$, $U=U_b$, and $V=V_b$ for $VP_5$, and so on.

Other conversion techniques may be used to build the RGB values.

Figure 7:
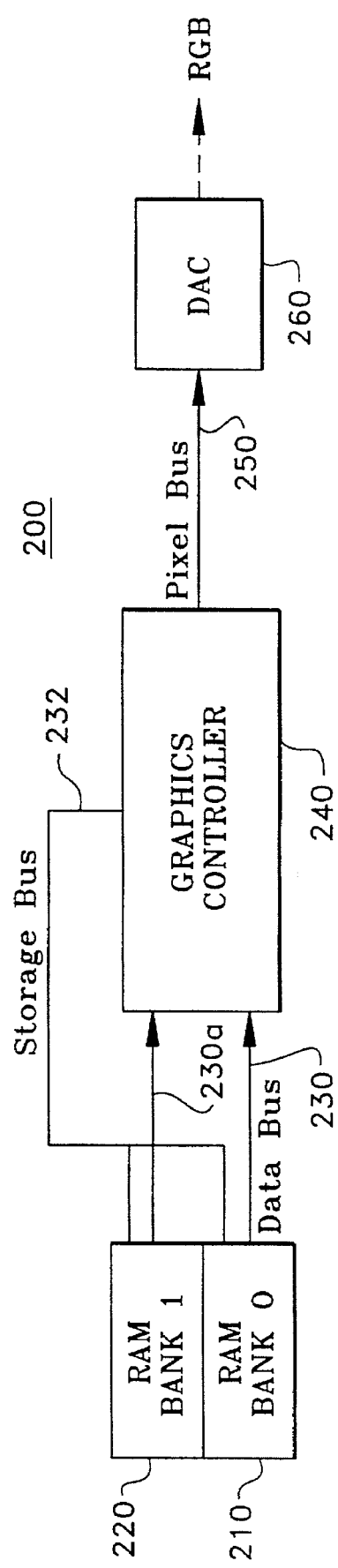

In the preferred embodiment, chroma keying is preferably used on the graphics pixel stream is used to determine whether to show a graphics pixel or a video pixel. If $GP_3$ and $GP_4$ held pixel values equal to the chroma key value, then the merged graphics and video pixel stream, the visual pixel stream, provided to the digital-to-analog converter would have the following format: $GP_1\ GP_2\ VP_3\ VP_4\ GP_5\ GP_6\ GP_7\ GP_8\ GP_9 \ldots$ Referring now to FIG. 7, there is shown a block diagram illustrating the operation of apparatus 200 for processing visual data according to a second preferred embodiment of the present invention. The invention shown includes first storage means 210 for storing a first bit plane of visual data in a first format. First storage means 210 is coupled to graphics controller 240 through storage bus 232. It will be understood that graphics controller 240 may be substantially similar to graphics controller 140 of apparatus 100 and video processor 30 of video accelerator subsystem 31. First storage means 210 and graphics controller 240 are also coupled by data bus 230. The invention also includes second storage means 220 for storing a second bit plane of visual data in a second format different from the first format. Second storage means 220 is coupled to graphics controller 240 through storage bus 232. Second storage means 220 and graphics controller 240 are also coupled by data bus 230a.

Graphics controller 240 includes means for forming a merged pixel stream from visual data stored on said first and second storage means. Means 260 for displaying the merged pixel stream is also provided. Means 260 is coupled to graphics controller 240 by pixel bus 250. In the preferred embodiment, data bus 230 and data bus 230a are separate thirty two bit buses. In an alternative embodiment, a single sixty four bit data bus may be used to couple both first storage means 210 and second storage means 220 to graphics controller 240. Data buses of other widths may also be used. Apparatus 200 functions substantially in accordance with apparatus 100, with a second storage means having been received by means 120. Apparatus 200 is thus configured to operate either in the dual color space or the expanded single frame buffer modes described above.

Figure 8:
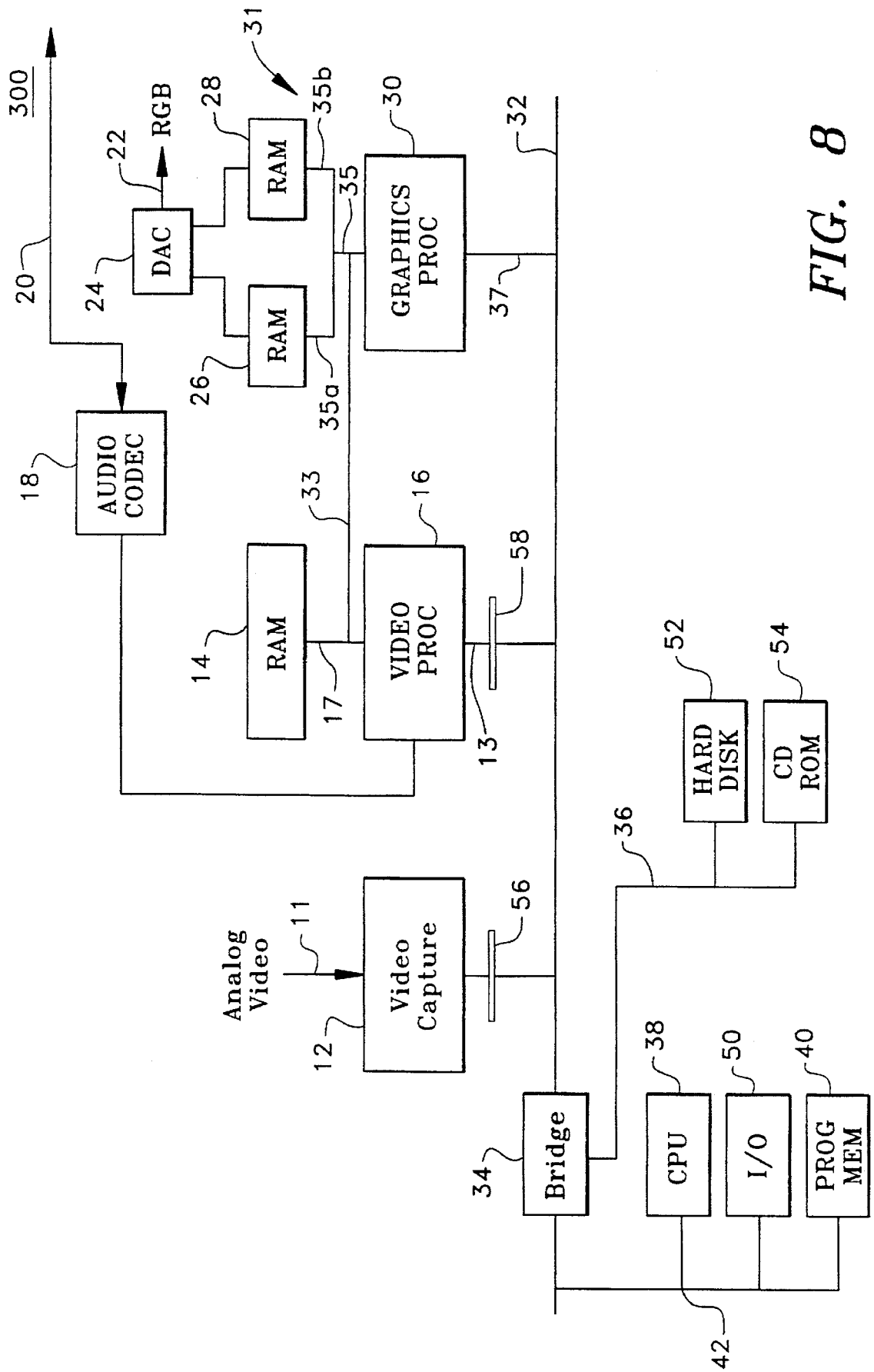
FIG. 8 is a block diagram representation of an alternate embodiment of the system of FIG. 1.

Referring now to FIG. 8, there is shown a block diagram illustrating the operation of an apparatus, designated generally 300, for processing visual data according to an alternate preferred embodiment of the present invention. The invention shown includes video processor 16, coupled to bus 32 by bus 13 and interconnect 58. video processor 16 may receive compressed data, decompressing it, and storing the decompressed data in memory 14 by way of bus 17. The invention also includes graphics processor 30 which is coupled to system bus 32 by way of bus 37 and to memories 26, 28 by way of bus 35.

Embodiment 300 is provided with first storage means 26 for storing a first bit plane of visual data in a first format. First storage means 26 is coupled to graphics processor 30 by way of data bus 35a which, along with data bus 35b, may branch from graphics processor bus 35. In the preferred embodiment, data bus 35a and data bus 35b are separate eight bit buses. In an alternative embodiment, single sixteen bit data bus 35 may be used to couple both first storage means 26 and second storage means 28 to graphics processor 30. Data buses of other widths may also be used. The invention also includes second storage means 28 for storing a second bit plane of visual data in a second format different from the first format. Second storage means 28 and graphics processor 30 are coupled to each other by data bus 35b.

Digital-to-analog converter means 24, coupled to memories 26, 28 for converting pixel data from memories 26, 28 is also provided in embodiment 300. Converter 24 is not directly coupled to graphics processor 30 in embodiment 300. The use of video data bus 33, coupling processors 16, 30 by way of buses 17, 35, permits apparatus 300 to function substantially in accordance with apparatus 10a when bus 32 has a relatively-low bandwidth. Apparatus 300 may be configured to operate either in dual color space mode or the expanded single frame buffer modes. Additionally, apparatus 300 may be operated with or without video capture 12 as previously described.

Figure 9:
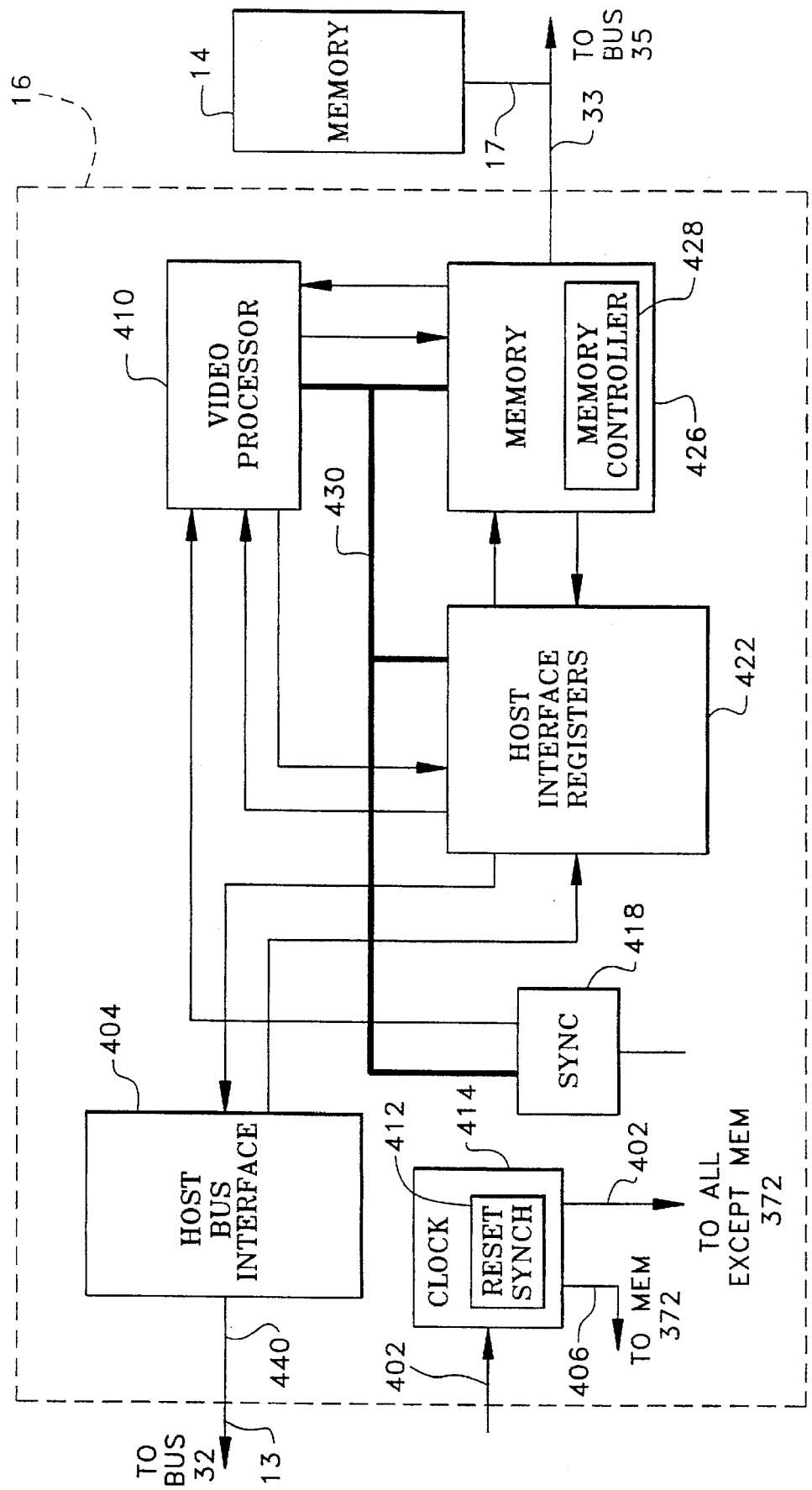
FIG. 9 is a block diagram representation of the integrated video processing system of FIG. 8.

Referring now to FIG. 9, there is shown a more detailed block diagram representation of processor 16 of embodiment 300. Processor 16 may be an integrated video processing system such as the one disclosed in detail in "Reconfigurable Interrupt Device", U.S. patent Ser. No. 08/051,038 filed Apr. 21, 1993 by Farrell et al., and incorporated by reference herein. Integrated video processing system 16 includes digital video processor 410 for processing video signals applied to integrated video processing system 16, host bus interface 404 for interfacing video processing system 16 to bus 32 by way of interconnect 58, synchronizer 418 containing several serial input/output communication channels which may be used for interfacing system 16 with various integrated circuits.

Also included in integrated video processing system 16 are host interface registers 422 coupled to processor 410 by way of internal processor system bus 430 for interfacing video processor 410 with external memory, video memory 426 having memory controller 428 and clock circuitry 414. Clock circuitry 414 is provided with reset synchronization circuiting 412 for receiving a input clock signal on input line 402 to synchronize the phase of divided down clock signals which may appear on output line 406 within integrated video processing system 16 along with the main clock signal on line 402.

Figure 10:
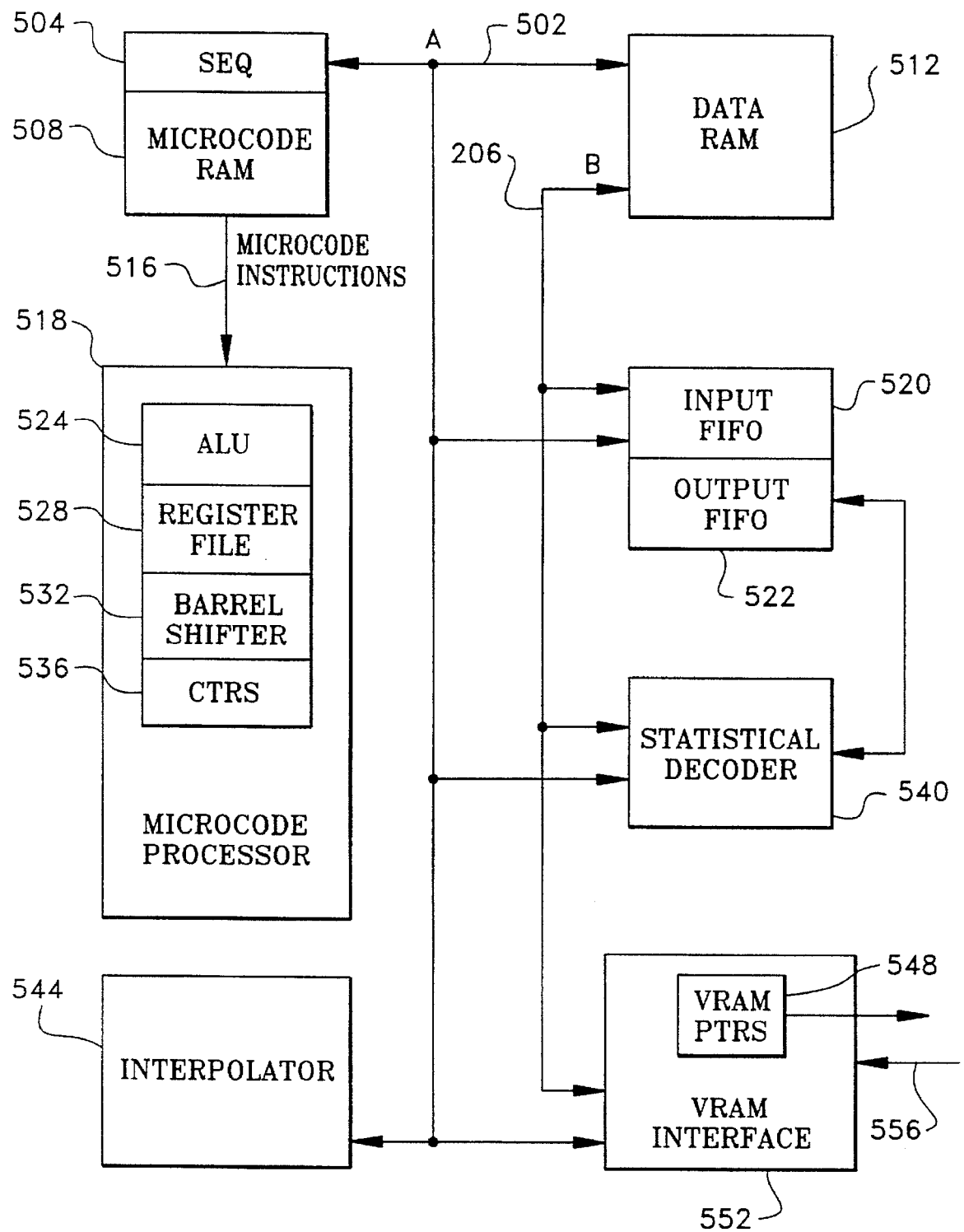
FIG. 10 is a block diagram representation of the internal video processor of the integrated video processing system of FIG. 8.

Referring now to FIG. 10, there is shown a more detailed block diagram representation of the architecture of digital video processor 410 within integrated video processing system 16. Within digital video processor 410 microcode routines in microcode RAM 508 under the control of sequencer 504 may be executed by microcode processor 518 in order for digital video processor 410 to perform its processing functions. The instructions of microcode RAM 508 are applied to microcode processor 518 by way of instruction bus 516. Microcode processor 518 of video processor 410 includes arithmetic logic unit 524, register file 528, barrel shifter 532 and counters 536.

Arithmetic logic unit 524 of microcode processor 518 performs sixteen bit arithmetic and logic operations. Arithmetic logic unit 524 may also operate as two independent eight bit arithmetic logic units to provide a dual-add-with-saturate function. The two operands of arithmetic logic unit 524 come either from values held in input latches within arithmetic logic unit 524 or from eavesdropping on A bus 502 or B bus 506 of video processor 410. The result of any operations performed by arithmetic logic unit 524 is latched in an arithmetic logic unit output register. In a subsequent instruction, the result in this output register may be transferred to A bus 502, B bus 506 or other destinations.

Using the microcode routines in RAM 508, microcode processor 518 may read and write an arithmetic logic unit condition flag register. This may be used to save and restore the state of the flags in the flag register. The dual-add-with-saturate function of arithmetic logic unit 524 performs independent eight-bit additions on the upper and lower bytes of two arithmetic logic unit operands, A and B. The two bytes of the A operand are treated as unsigned binary numbers. The two bytes of the B operand are treated as offset binary numbers with an offset of one hundred twenty-eight. The upper and low byte results are treated as nine bit offset binary, including the carry output of each byte, with an offset of one hundred twenty-eight and are saturated to a range of zero to two hundred fifty-five. This operating is symmetric. Either the A operand or the B operand may be defined as the unsigned binary value, and the other operand may be treated as the offset signed binary value.

Arithmetic logic unit 524 of microcode processor 518 is also provided with a dual-subtract-with-saturate function. The dual-subtract-with-saturate function is similar to the dual-add-with-saturate function as previously described. It calculates A−B+128 on each eight bit half of the two sixteen bit inputs and clamps the results to a value between zero and two hundred fifty-five. This may be viewed as subtracting an offset binary signed byte, between negative one hundred twenty-eight and one hundred twenty-seven, from an unsigned byte, between zero and two hundred fifty-five.

Within register file 528 of microcode processor 518, there are sixteen general purpose data registers. Each general purpose register is sixteen bits wide and is connected to both A bus 502 and B bus 506. These general purpose data registers are designated r0–r15 both when they are used as sources and when they are used as destinations within the video processor 410. All registers r0–r15 are functionally identical except register r0. Register r0 of register file 528 also includes logic for bit shifting and byte swapping. The operations of interpolator 544, data RAM 512, FIFO channels 520, 522 and statistical decoder 540 are described in detail in Farrell et al. Likewise descriptions of VRAM interface 552 having pointers 548 and bus 556 may also be found in Farrell et al.

What is claimed is:

1. A digital video processing system having a plurality of connecting means, comprising:

a first video data bus for transmitting video data;

digital graphics processing means directly connected to said first video data bus;

a first graphics memory directly connected to said digital graphics processing means by a first graphics memory bus;

a second graphics memory directly connected to said digital graphics processing means by a second graphics memory bus;

said first video data bus having interconnect means for mating with a digital video processor and directly connecting said first video data bus to said digital video processor;

video processor memory means directly connected to said digital video processor by a video processor memory bus; and a second video data bus directly connecting said first and second graphics memories and said digital video processor, and said video processor memory means and said digital graphics processing means.

2. The digital video processing system of claim 1, wherein an interconnect means of said plurality of connecting means is adapted to receive a video capture subsystem and directly connect said video capture subsystem to said first video data bus.

3. The digital video processing system of claim 1, wherein said first and second graphics memory buses comprise a single graphics memory bus means.

4. The digital video processing system of claim 1, further comprising:

a digital-to-analog converter means directly connected to said first and second graphics memories.

5. The digital video processing system of claim 1, further comprising:

a central processing unit including central processing memory means directly connected to said first video data bus.

6. The digital video processing system of claim 1, wherein an interconnect means of said plurality of connecting means is adapted to receive a video capture subsystem and directly connect said video capture subsystem to said first video data bus and said first and second graphics memory buses comprise a single graphics memory bus means, further comprising:

a digital-to-analog converter means directly connected to said first and second graphics memories; and a central processing unit including central processing memory means directly connected to said first video data bus.

7. A digital video processing system having a plurality of connecting means, comprising:

a first video data bus for transmitting video data;

digital graphics processing means directly connected to said first video data bus;

a first graphics memory directly connected to said digital graphics processing means by a first graphics memory bus;

a second graphics memory directly connected to said digital graphics processing means by a second graphics memory bus;

said first video data bus having interconnect means for mating with a digital video processor and directly connecting said first video data bus to said digital video processor;

video processor memory means directly connected to said digital video processor by a video processor memory bus; and a second video data bus directly connecting said first and second graphics memories and said digital video processor, and said video processor memory means and said digital graphics processing means, wherein said second video data bus has a higher bandwidth than does said first video data bus.

8. The digital video processing system of claim 7, wherein an interconnect means of said plurality of connecting means is adapted to receive a video capture subsystem and directly connect said video capture subsystem to said first video data bus.

9. The digital video processing system of claim 7, wherein said first and second graphics memory buses comprise a single graphics memory bus means.

* * * * *

UNITED STATES PATENT AND TRADEMARK OFFICE
CERTIFICATE OF CORRECTION

PATENT NO. : 5,640,543

DATED : June 17, 1997

INVENTOR(S) : Robert Farrell and Louis Lippincott

It is certified that error appears in the above-identified patent and that said Letters Patent is hereby corrected as shown below:

Title Page [56] References Cited, U.S. PATENT DOCUMENTS, add:

| | | |
|---|---|---|
| 4,751,583 | 6/88 | Levine |
| 5,193,145 | 3/93 | Akeley |

Title Page [56] OTHER PUBLICATIONS, add:

IBM Technical Disclosure Bulletin, Vol. 9, No. 3, 8/86, Multi-Port Serial Comm. Controller with Dual-Port RAM Interface.

Signed and Sealed this

Third Day of March, 1998

*Attest:*

BRUCE LEHMAN

*Attesting Officer*  *Commissioner of Patents and Trademarks*